US010892972B2

(12) United States Patent
Ellegaard (10) Patent No.: US 10,892,972 B2
(45) Date of Patent: Jan. 12, 2021

(54) SCHEDULED NETWORK SETUP TEST METHOD AND SYSTEM

(71) Applicant: Microsemi Storage Solutions, Inc., Aliso Viejo, CA (US)

(72) Inventor: Lars Ellegaard, Copenhagen (DK)

(73) Assignee: Microsemi Storage Solutions, Inc., Chandler, AZ (US)

(*) Notice: Subject to any disclaimer, the term of this patent is extended or adjusted under 35 U.S.C. 154(b) by 266 days.

(21) Appl. No.: 15/949,096

(22) Filed: Apr. 10, 2018

(65) Prior Publication Data
US 2018/0316592 A1 Nov. 1, 2018

Related U.S. Application Data

(60) Provisional application No. 62/490,049, filed on Apr. 26, 2017.

(51) Int. Cl.
*H04L 12/26* (2006.01)
*H04L 12/833* (2013.01)
*H04L 12/841* (2013.01)

(52) U.S. Cl.
CPC .......... *H04L 43/50* (2013.01); *H04L 43/0852* (2013.01); *H04L 43/106* (2013.01); *H04L 47/283* (2013.01); *H04L 47/31* (2013.01)

(58) Field of Classification Search
CPC ............. G06F 2119/06; G06F 2119/12; G06F 30/327; G06F 30/3312; G06F 30/396; G06F 43/106; G06F 43/50; G06F 47/283; G06F 47/31; G06F 43/0852
See application file for complete search history.

(56) References Cited

U.S. PATENT DOCUMENTS

| | | | |
|---|---|---|---|
| 6,229,367 B1 | 5/2001 | Choudhury |
| 6,377,585 B1 | 4/2002 | Funderburk |
| 6,738,942 B1 | 5/2004 | Sridharan |
| 6,876,242 B2 | 4/2005 | Zampetti |
| 6,985,499 B2 | 1/2006 | Elliot |
| 7,230,923 B2 | 6/2007 | Onvural |

(Continued)

OTHER PUBLICATIONS

Aleksandra, et al., "Synchronization challenges in packet-based Cloud-RAN fronthaul for mobile networks", 2015 IEEE International Conference on Communication Workshop (ICCW), IEEE, Jun. 8, 2015 (Jun. 8, 2015), pp. 2721-2726.

(Continued)

*Primary Examiner* — Khaled M Kassim
(74) *Attorney, Agent, or Firm* — Glass and Associates; Kenneth Glass (57) ABSTRACT

A setup test method for scheduled networks, the method constituted of: transmitting a frame to at least one network switch; responsive to the transmitted frame arriving at a first time gate of the at least one network switch, timestamping the transmitted frame with a first time stamp; responsive to the transmitted frame traversing a second time gate of the at least one network switch, additionally timestamping the transmitted frame with a second time stamp; reading the first time stamp; responsive to the read first time stamp, determining the time of arrival of the transmitted frame at the first time gate; reading the second time stamp; and responsive to the read first time stamp, determining the time of traversal of the transmitted frame through the second time gate.

8 Claims, 5 Drawing Sheets

(56) References Cited

U.S. PATENT DOCUMENTS

| | | |
|---|---|---|
| 7,231,008 B2 | 6/2007 | Choudhury |
| 7,382,845 B1 | 6/2008 | Shenoi |
| 7,535,931 B1 | 5/2009 | Zampetti |
| 7,876,788 B2 | 1/2011 | Elliot |
| 8,064,484 B2 | 11/2011 | Zampetti |
| 8,107,502 B2 | 1/2012 | Darras |
| 8,416,902 B2 | 4/2013 | Kyles |
| 8,451,867 B2 | 5/2013 | Dowd |
| 8,571,014 B2 | 10/2013 | Joergensen |
| 8,594,134 B2 | 11/2013 | Zampetti |
| 8,644,350 B2 | 2/2014 | Kristoffersen |
| 8,798,223 B2 | 8/2014 | Choudhury |
| 8,804,892 B2 | 8/2014 | Kyles |
| 8,848,746 B2 | 9/2014 | Swartzentruber |
| 8,873,588 B2 | 10/2014 | Joergensen |
| 8,937,974 B1 | 1/2015 | Pannell |
| 8,971,352 B2 | 3/2015 | Jost |
| 9,042,366 B2 | 5/2015 | Swartzentruber |
| 9,160,473 B2 | 10/2015 | Mani |
| 9,246,615 B2 | 1/2016 | Ellegard |
| 9,282,024 B2 | 3/2016 | Branscomb |
| 9,641,409 B2* | 5/2017 | Edsall ................. H04L 43/0852 |
| 10,084,559 B1* | 9/2018 | Devineni .............. H04J 3/0697 |
| 2006/0104216 A1* | 5/2006 | O'Keeffe ................. H04L 47/10 |
| | | 370/252 |
| 2008/0008178 A1* | 1/2008 | Tychon .................. H04L 45/12 |
| | | 370/392 |
| 2009/0067535 A1* | 3/2009 | Koudo ................. H04L 12/2803 |
| | | 375/295 |
| 2010/0309932 A1 | 12/2010 | Diab et al. |
| 2011/0026521 A1* | 2/2011 | Gamage ................. H04L 43/028 |
| | | 370/389 |
| 2013/0173950 A1* | 7/2013 | Banerjea .............. H04J 3/0667 |
| | | 713/503 |
| 2013/0215743 A1* | 8/2013 | Pannell .................. H04L 12/28 |
| | | 370/230.1 |
| 2013/0301634 A1* | 11/2013 | Ehlers ................ H04L 12/4625 |
| | | 370/350 |
| 2014/0186025 A1* | 7/2014 | Fang ..................... H04J 3/0667 |
| | | 398/25 |
| 2014/0269672 A1* | 9/2014 | Zampetti .......... H04W 56/0015 |
| | | 370/350 |
| 2015/0103832 A1* | 4/2015 | Chandhoke .......... H04L 49/206 |
| | | 370/392 |
| 2015/0365337 A1 | 12/2015 | Pannell |
| 2016/0147568 A1 | 5/2016 | Poledna et al. |

OTHER PUBLICATIONS

Thubert, "Deterministic Networking Architecture; Draft-Finn-Detnet-Architecture," Internet Engineering Task Force, IETF; Standardworkingdraft, Internet Society (ISOC), 4, Rue Des Falaises CH-1205 Geneva, Switzerland, Aug. 18, 2016 (Aug. 18, 2016), pp. 1-32.

"Extended European Search Report" dated Sep. 5, 2018, European Patent Application No. 18167121.5.

* cited by examiner

FIG. 1A

*PRIOR ART*

*PRIOR ART*

PRIOR ART

SCHEDULED NETWORK SETUP TEST METHOD AND SYSTEM

TECHNICAL FIELD

The present invention relates to the field of scheduled networks and in particular to a scheduled network setup test method and system.

BACKGROUND OF THE INVENTION

In Ethernet, internet protocol (IP) and multiprotocol label switching (MPLS) network services can be defined for end-users or other operators by service providers. Services are typically regulated via service level agreements covering performance parameters such as bandwidth, overall delay and availability. Service providers can use bandwidth policing at the input to the network to protect it against a misbehaving user and can use bandwidth shaping at the egress towards the user to limit the resulting bandwidth to the agreed amount. To measure bandwidth delay, availability and other parameters, supervision instruments have been put in place to estimate the performance of the service. Typically, operation, administration and maintenance (OAM) based methods are used. Examples of these are defined in ITU-T Y.1731, MEF 48 and IETF request for comments (RFCs). It is also common practice to conduct tests using OAM prior to activating the service thereby ensuring proper delivery. Many applications are also time sensitive and require strict performance in the time domain, such as an upper bound on the latency experienced or controlled frame transmission times. The basis for this is standardized in IEEE 802.1 Time Sensitive Networks (TSN) and IETF Deterministic Networking (DetNet). These applications have similar requirements as described above to the monitoring and correct setup of the service. Instruments for measuring parameters like bandwidth and delay are already defined as described earlier, but aspects related to time scheduling are not covered. For instance, existing delay measurement mechanisms are fully capable of measuring the delay through the network. However, this mechanism cannot detect if the TSN/DetNet functions operate correctly, or where the failure is if an out-of-bound delay is detected. In particular, when the network consists of many devices and many flows, the calculation of the required parameter settings is complicated and typically requires off-line tools. Being able to test if the real configuration matches the expected configuration eases locating configuration failures, thus improving speed of deployment. It also improves performance and bandwidth utilization by reducing otherwise necessary margins. Two typical scenarios are:

scheduling and testing all streams in a newly configured network; and adding a stream to an already verified and running network.

IEEE 802.1Qci (Per-Stream Filtering and Policing) specifies how an ingress stream can be bandwidth policed and time gated. Bandwidth policing means that frames exceeding the agreed average bandwidth and short term burst can be marked and possibly discarded. Time gating means that a frame arriving in a defined time window is allowed to pass whereas if it arrives outside this window it is discarded thus protecting the network against misbehaving streams. IEEE 802.1 Qbv (Time Aware Shaping) specifies how frames from a priority class are allowed to be scheduled for transmission on an egress port in a defined time window. Outside this window, frames from this priority cannot be scheduled. US patent application publication S/N US 20160/147568, published on May 26, 2016 to Poledna et al., the entire contents of which is incorporated herein by reference, defines a similar time scheduling method for a queue. IEEE 802.1 Qch (Cyclic Queuing and Forwarding) specifies a method, using Qci and Qbv, where frames of a priority class are inserted into one of two queues in alternate cycles and scheduled for transmission in the opposite cycle. This method has a maximum latency of approximately one cycle per switch. In all of the above cases the time window is defined by a gate open and a gate close time.

Figure 1A:
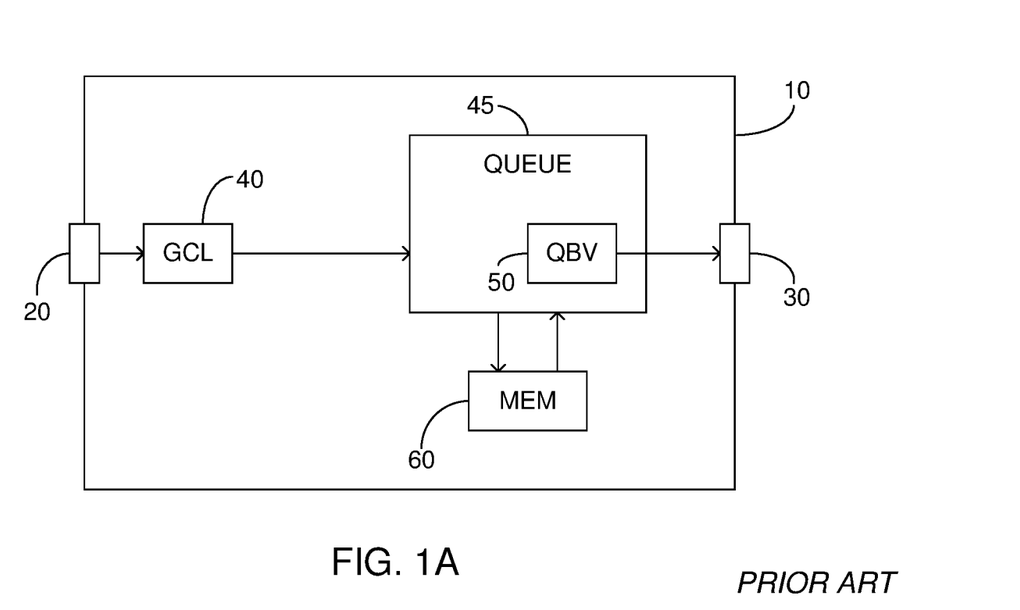
FIG. 1A illustrates a high level block diagram of a prior art TSN switch.

FIG. 1A illustrates a high level block diagram of a prior art TSN switch 10, TSN switch 10 comprising: an ingress port 20; an egress port 30; an ingress time gate 40, i.e. a Qci time gate; a queue system 45 comprising a scheduled transmission time gate 50, i.e. a Qbv time gate; and a frame memory 60. Ingress port 20 is coupled to an input of ingress time gate 40. An output of ingress time gate 40 is coupled to an input of queue system 45 and an output of queue system 45 is coupled to egress port 30. Queue system 45 is further coupled to frame memory 60. For simplicity, only a single ingress port 20 and a single egress port 30 are illustrated, however this is not meant to be limiting in any way. Typically, a plurality of ingress ports 20 are provided, each with a respective ingress time gate 40, and a plurality of egress ports 30 are provided, each with a respective scheduled transmission time gate 50. Each of the plurality of ingress ports 20 is coupled to queue system 45, via the respective ingress time gate 40, and each egress port 30 is coupled to a respective scheduled transmission time gate 50 of queue system 45.

Figure 1B:
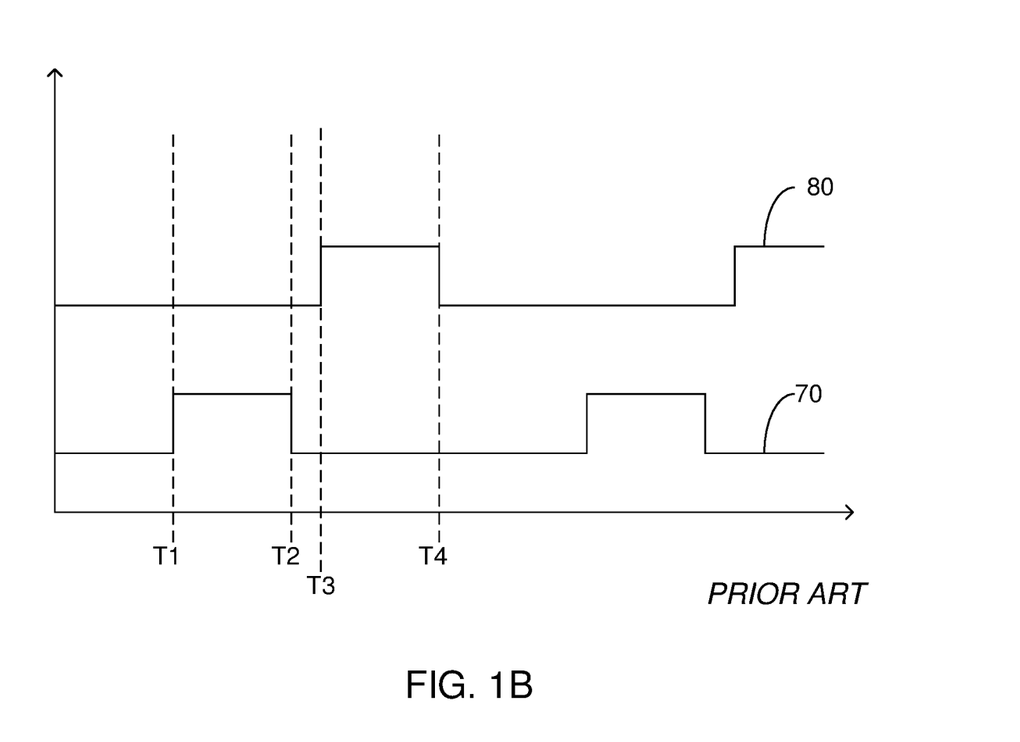
FIG. 1B illustrates a graph of the control signals of time gates of the TSN switch of FIG. 1A.

FIG. 1B illustrates a graph of the control signals of ingress time gate 40 and scheduled transmission time gate 50, where the x-axis represents time and the y-axis represents high and low signal values. In operation, at time T1 ingress time gate 40 opens, as indicated by a high signal 70. At time T2, ingress time gate 40 closes, as indicated by a low signal 70. At time T3, scheduled transmission time gate 50 opens, as indicated by a high signal 80. At time T4, scheduled transmission time gate 50 closes, as indicated by a low signal 80. If a data frame arrives at ingress port 20 while ingress time gate 40 is open, it is allowed to pass. If the data frame arrives at ingress port 20 while ingress time gate 40 is closed, it is discarded. If the data frame arrives at scheduled transmission time gate 50 before the time gate opens, the data frame is stored in frame memory 60 and waits for opening of the time gate in order to pass through to egress port 30.

Figure 2:
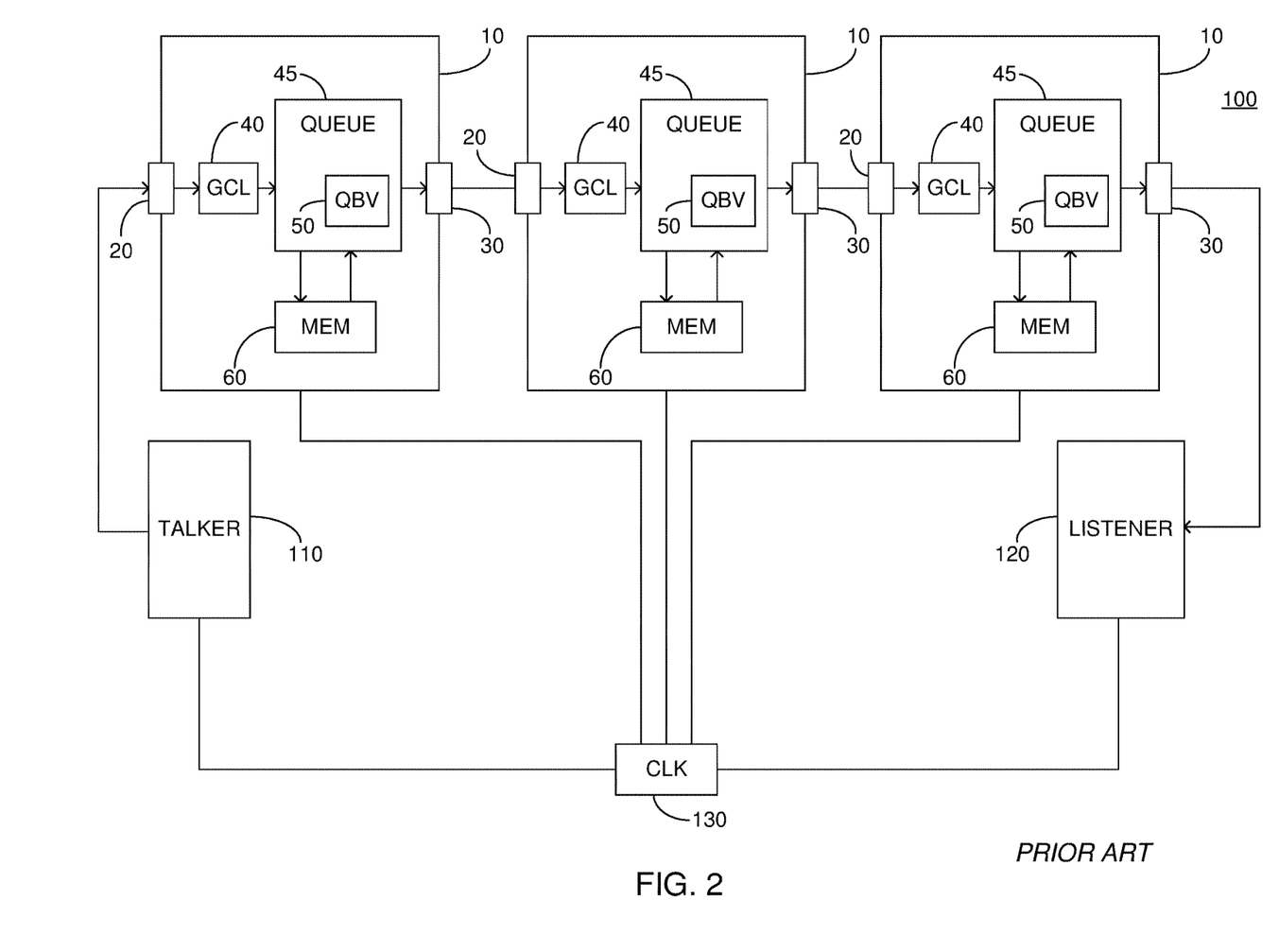
FIG. 2 illustrates a prior art TSN.

FIG. 2 illustrates a prior art time sensitive network 100, time sensitive network comprising: a plurality of TSN switches 10; a talker 110; a listener 120; and a common clock 130. TSN switches 10 are coupled in series, with talker 110 in communication with the first of the series coupled TSN switches 10 and listener 120 in communication with the ultimate of the series coupled TSN switches 10. Each of talker 110, listener 120 and TSN switches 10 is in communication with common clock 130. The term "talker", as used herein, is meant to include any device which is set up to transmit data through a scheduled network. The term "listener", as used herein, is meant to include any device which is set up to receive data through a scheduled network.

In operation, a data frame is generated in talker 110 and is transmitted to the first of the series coupled TSN switches 10. Preferably, the ingress time gates 40 and scheduled transmission time gates 50 of TSN switches 10 are arranged such that each time gate opens when the data frame is expected to arrive, as referenced against common clock 130. Specifically, the time gates of the first TSN switch 10 open earlier than subsequent TSN switches 10. In the event that the data frame arrives at an ingress port 20 of a TSN switch 10 before its ingress time gate 40 opens, or after its ingress time gate 40 closes, the frame is discarded. In the event that the data frame arrives at the ingress port 20 while its ingress time gate 40 is open, the frame is allowed to pass. In the event that the data frame arrives at a queue system 45 before the respective scheduled transmission time gate 50 opens, the data frame is stored in frame memory 60 and waits in the output queue until scheduled transmission time gate 50 opens. In the event that the data frame arrives when the respective scheduled transmission time gate 50 is open, the data frame is allowed to pass through to the respective egress port 30. In the event that the data frame arrives after the respective scheduled transmission time gate 50 closes, the data frame is stored in frame memory 60 and waits in the output queue until scheduled transmission time gate 50 opens, however usually in such an event the data frame is eventually discarded because too much time will elapse before the respective scheduled transmission time gate 50 again opens. Arrival of data frames at time gates when they are closed can be caused by network failures, incorrect setup of talker 110 transmission time or incorrect setup of time gate open/close times.

What is desired, and not provided by the prior art, is a configuration for automatic testing of time gate open/close timing in scheduled networks.

SUMMARY OF THE INVENTION

Accordingly, it is a principal object of the present invention to overcome at least some of the disadvantages of the prior art. This is provided in one embodiment by a setup test method for scheduled networks, the method comprising: transmitting a frame to at least one network switch; responsive to the transmitted frame arriving at a first time gate of the at least one network switch, timestamping the transmitted frame with a first time stamp; responsive to the transmitted frame traversing a second time gate of the at least one network switch, additionally timestamping the transmitted frame with a second time stamp; reading the first time stamp; responsive to the read first time stamp, determining the time of arrival of the transmitted frame at the first time gate; reading the second time stamp; and responsive to the read first time stamp, determining the time of traversal of the transmitted frame through the second time gate.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawing.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term "coupled" as used herein is not meant to be limited to a direct connection, and allows for intermediary devices or components without limitation.

Figure 3:
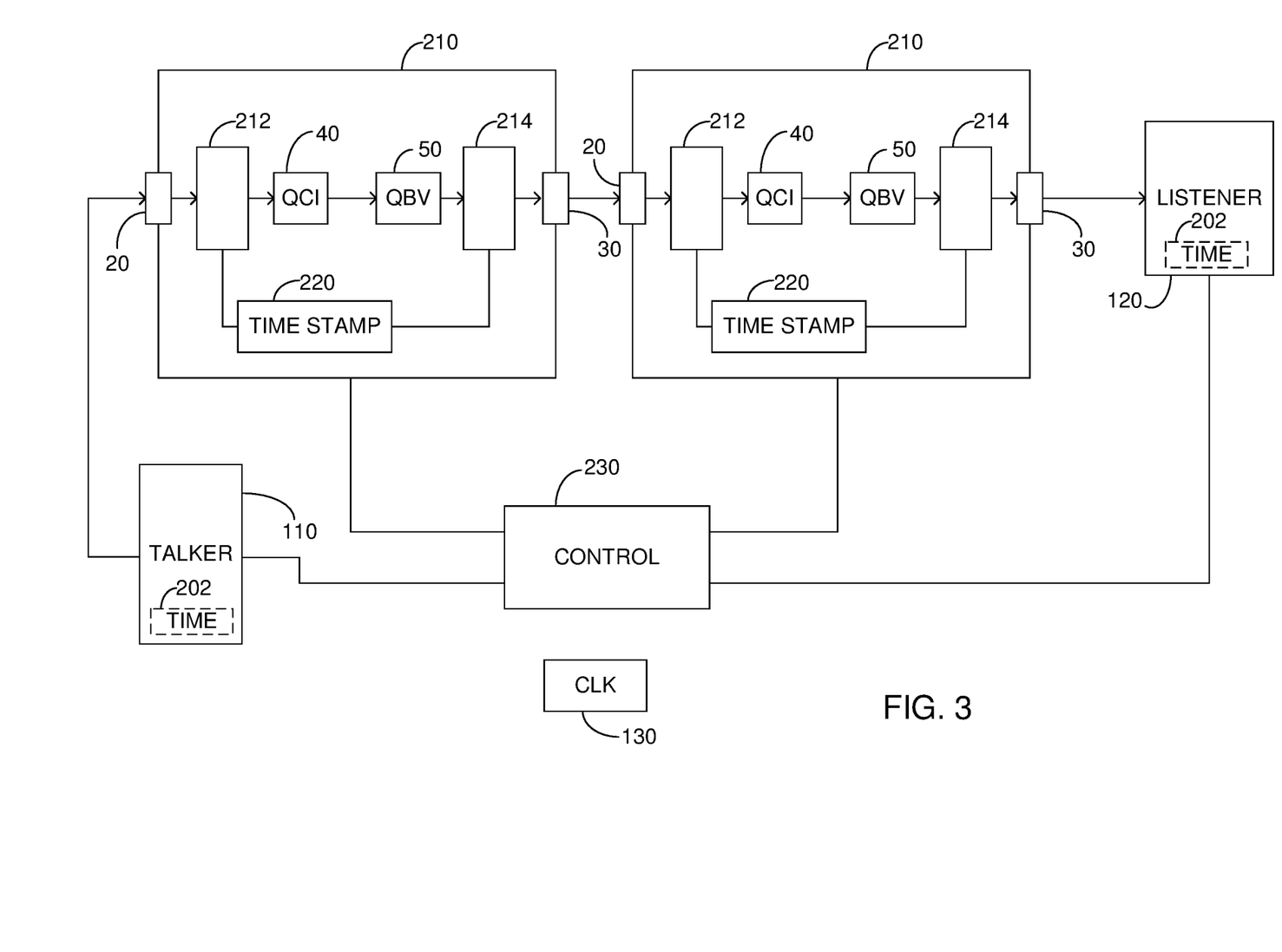
FIG. 3 illustrates a high level block diagram of a scheduled network, in accordance with certain embodiments.

FIG. 3 illustrates a high level block diagram of a scheduled network 200, scheduled network 200 comprising: a talker 110, optionally comprising a timestamp functionality 202; a listener 120, optionally comprising a timestamp functionality 204; a plurality of network switches 210, each network switch 210 comprising an ingress port 20, an egress port 30, an ingress time gate 40, a scheduling transmission time gate 50, an ingress module 212, an egress module 214 and a timestamp functionality 220; a common clock; and a control circuitry 230. Although for simplicity each network switch 210 is described and illustrated herein as comprising a single ingress port 20 and a single egress port 30, this is not meant to be limiting in any way. In one embodiment, each network switch 210 comprises a plurality of ingress ports 20, each with an associated ingress time gate 40, and a plurality of egress ports 30, each with an associated scheduling transmission time gate 50, as will be described below in relation to TSN switch 300.

Talker 110 is coupled to ingress port 20 of a first network switch 210 and the plurality of network switches 210 are coupled in series such that ingress port 20 of each network switch 210 is coupled to egress port 30 of a preceding network switch 210. Egress port 30 of the ultimate of the serially coupled network switches 210 is coupled to listener 120. Ingress port 20 of each network switch 210 is coupled to an input of the respective ingress time gate 40, via the respective ingress module 212, and egress port 30 of each network switch 210 is coupled to an output of the respective scheduled transmission time gate 50, via the respective egress module 214. In one embodiment, each ingress time gate 40 is positioned within the respective ingress module 212. An output of each ingress time gate 40 is coupled to an input of the respective scheduled transmission time gate 50, optionally via a queue system (not shown for simplicity). Timestamp functionality 220 is coupled to ingress module 212 and egress module 214. In one embodiment, as will be described below in relation to TSN switch 300, timestamp functionality 220 comprises two separate units (not shown), a first timestamp unit positioned within ingress module 212 and the second timestamp unit positioned within egress module 214. Common clock 130 is coupled to each of: talker 110; listener 120; each network switch 210; and control circuitry 230, the connections not shown for simplicity. Control circuitry 230 is coupled to each network switch 210. In one embodiment, control circuitry 230 is further coupled to talker 110 and listener 120.

In operation, a test data frame is generated at talker 110 and transmitted to the first network switch 210, optionally responsive to a command by control circuitry 230. In one embodiment, optional timestamp functionality 202 time stamps the generated test data frame before transmission. As described above, the transmission time of the test data frame and the open/close times of ingress time gates 40 and scheduled transmission time gates 50 are set in relation to common clock 130 such that the test data frame should arrive at each time gate when it is open. In one embodiment, responsive to the transmission of the test data frame, control circuitry 230 controls ingress module 212 of each network switch 210 to not discard the test data frame regardless of whether it arrives when the respective ingress time gate is open or closed. In another embodiment, the test data frame has a unique identifier and control ingress modules 212 are arranged not to discard data frames exhibiting such a unique identifier.

When the test data frame arrives at each ingress module 212, timestamp functionality 220 time stamps the test data frame in a respective predetermined section thereof. If the respective ingress time gate 40 is in a closed state when the test data frame arrives, the test data frame is allowed to pass through and is not discarded. When the test data frame passes through each scheduled transmission time gate 50 and arrives at the respective egress module 214, timestamp functionality 220 time stamps the test data frame in a respective predetermined section thereof. Optionally, when the test data frame arrives at listener 120, timestamp functionality 204 time stamps the test data frame in a respective predetermined section thereof. In one embodiment, the test data frame comprises a predetermined section for each time stamp of each network switch 210 and optionally for the time stamps of timestamp functionalities 202 and 204. In such an embodiment, upon arrival of the test data frame at listener 120 control circuitry 230 is arranged to read all the timestamps on the test data frame and determine whether the timing of the test data frame matched the timing of each of the time gates 40 and 50 of the plurality of network switches 210. Alternately, the timestamp information, or the entire test data frame, is output to an external system for analyzation.

In another embodiment, at each network switch 210, timestamp functionality 220 transmits a copy of the test data frame, or optionally a copy of the sections of the test data frame containing timestamps, to control circuitry 230. In such an embodiment, the timestamps of a previous network switch 210 are overwritten by the timestamps of the network switch 210 where the test data frame is currently in.

The above has been described in an embodiment where the test data frame is timestamped by timestamping functionality 220 after traversing each scheduled transmission time gate 50, however this is not meant to be limiting in any way. In another embodiment, the test data frame is timestamped by timestamping functionality 220 just prior to traversing the respective scheduled transmission time gate 50. Additionally, the above has been described in an embodiment where scheduled network 200 comprises a plurality of serially coupled network switches 210, however this is not meant to be limiting in any way. In another embodiment, scheduled network 200 comprises only a single network switch 200 and the test data frame is timestamped at the ingress time gate 40 and scheduled transmission time gate 50 of the single network switch 200.

Figure 4:
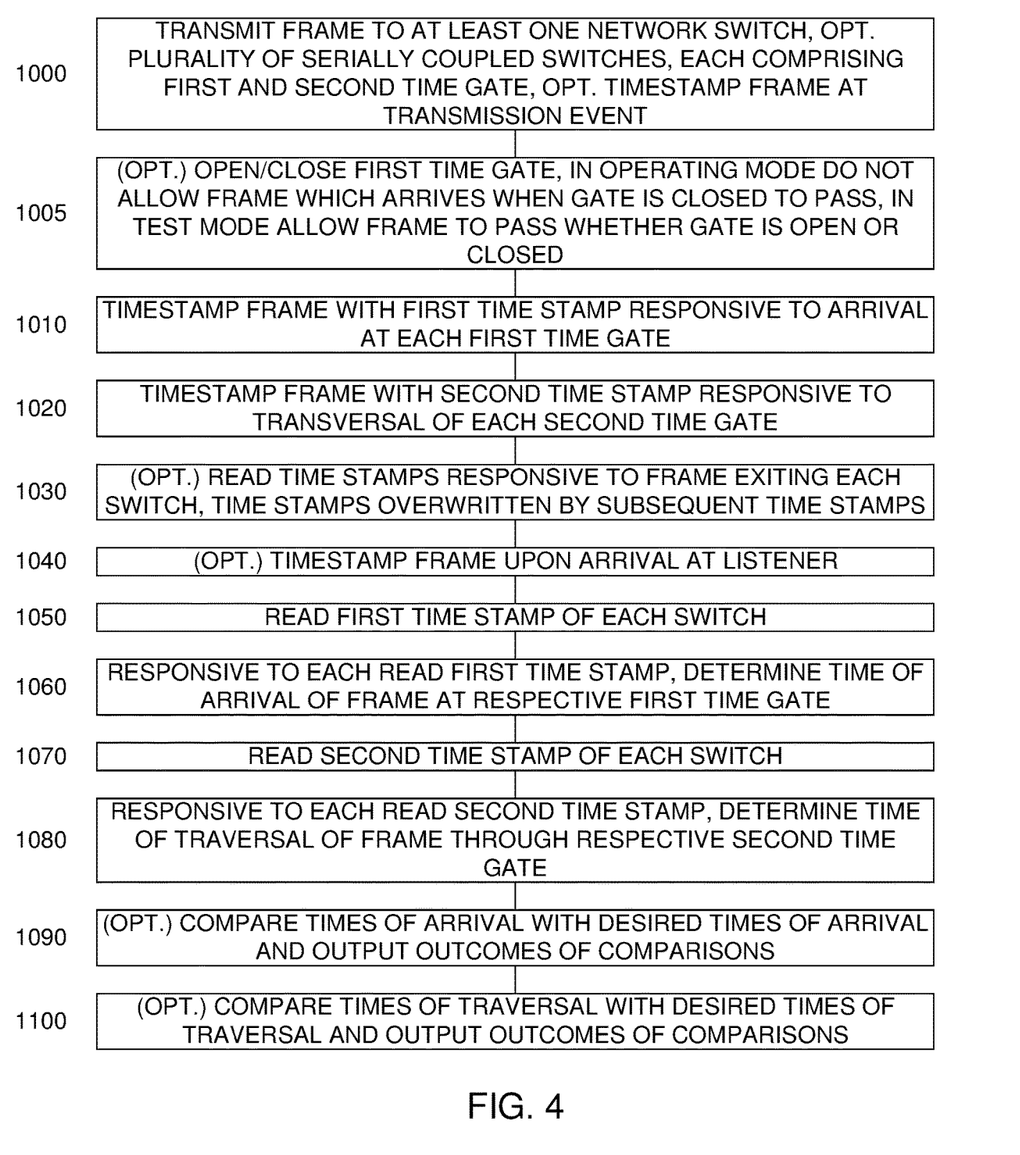
FIG. 4 illustrates a high level flow chart of a setup test method for scheduled networks, in accordance with certain embodiments.

FIG. 4 illustrates a high level flow chart of a setup test method for scheduled networks, according to certain embodiments. In stage 1000, a data frame is transmitted to at least one network switch, optionally to a plurality of network switches coupled in series. Each network switch comprises a first time gate and a second time gate, the first time gate controlling the entry of the data frame into the network switch and the second time gate controlling the exit of the data frame from the network switch. In one embodiment, the data frame is transmitted by a talker responsive to initiation of a transmission event. Optionally, responsive to the initiation of the transmission event, the data frame is timestamped.

In optional stage 1005, the first time gate of the at least one network switch of stage 1000 is alternately open and closed. In an operating mode, responsive to the transmitted data frame of stage 1000 arriving at the first time gate when the first time gate is closed, the data frame is discarded. In a testing mode, responsive to the transmitted frame arriving at the first time gate when the first time gate is closed, the transmitted data frame allowed to pass through even though the first time gate is closed. The timestamping described below is performed in the testing mode.

In stage 1010, responsive to the transmitted data frame of stage 1000 arriving at the first time gate of the at least one network switch, the transmitted frame is timestamped with a first time stamp. In the embodiment where the at least one network switch of stage 1000 comprises a plurality of network switches, the transmitted data frame is timestamped with a respective first time stamp when arriving at the first time gate of each of the plurality of network switches.

In stage 1020, responsive to the transmitted frame of stage 1000 traversing a second time gate of the at least one network switch, the transmitted frame is additionally timestamped with a second time stamp. In the embodiment where the at least one network switch of stage 1000 comprises a plurality of network switches, the transmitted data frame is timestamped with a respective second time stamp when traversing the second time gate of each of the plurality of network switches.

In optional stage 1030, in the embodiment where the at least one network switch of stage 1000 comprises a plurality of serial coupled network switches, the timestamps of stage 1010 and 1020, or a copy thereof, of each network switch are read by a control circuitry responsive to the data frame exiting the respective network switch. Optionally, the timestamps are read upon arriving at the next network switch. Additionally, the timestamps of stages 1010 and 1020 of each network switch are overwritten by the timestamps of a subsequent network switch.

In optional stage 1040, the transmitted data frame is received at a listener after traversing the at least one network switch and the transmitted data frame is timestamped when arriving at the listener.

In stage 1050, the first time stamp of each of the at least one network switch of stage 1010 is read. In stage 1060, responsive to each read first time stamp of stage 1050 the time of arrival of the transmitted frame at the respective first time gate is determined.

In stage 1070, the second time stamp of each of the at least one network switch of stage 1010 is read. In stage 1080, responsive to each read second time stamp of stage 1050 the time of traversal of the transmitted frame through the respective second time gate is determined.

In optional stage 1090, the determined time of arrivals at the first time gates of stage 1060 are compared with predetermined desired times of arrival and the determined time of traversals through the second time gates of stage 1080 are compared with predetermined desired times of traversal. Additionally, the outcomes of the comparisons are output.

In optional stage 1100, the optional talker timestamp of stage 1000 and the optional listener timestamp of optional stage 1040 are read. Responsive to the read talker timestamp, the time of transmission of the data frame of stage 1000 is determined. Responsive to the read listener timestamp, the time of arrival of the data frame at the listener is determined.

Figure 5:
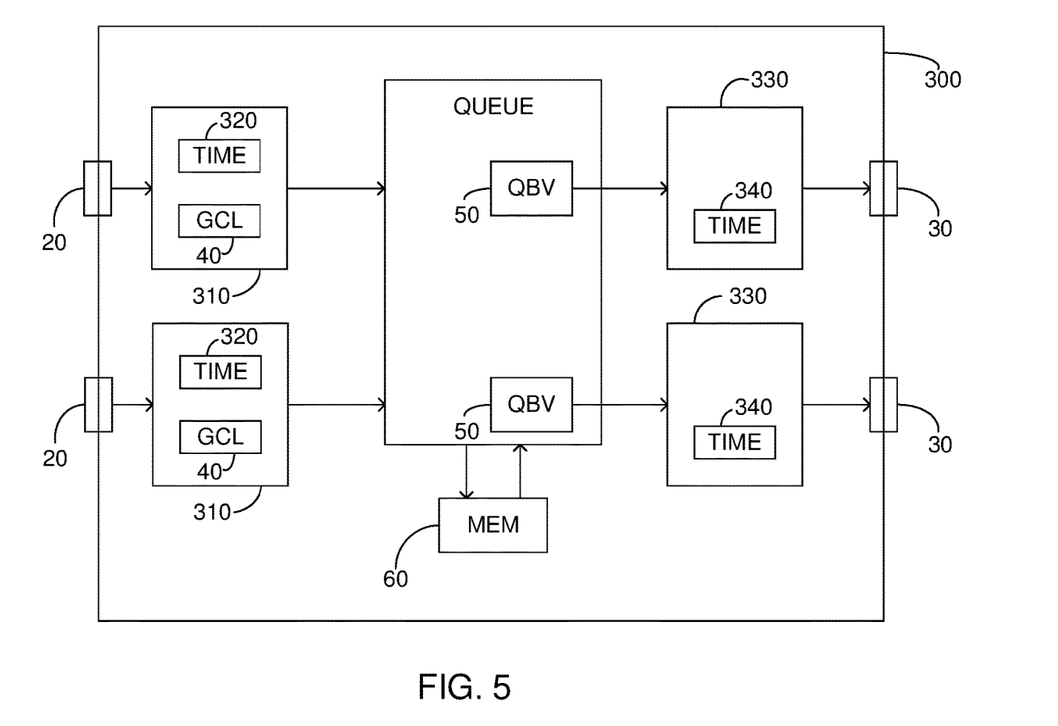
FIG. 5 illustrates a high level block diagram of a TSN switch, in accordance with certain embodiments.

FIG. 5 illustrates a high level block diagram of a TSN switch 300, TSN switch 300 comprising: a plurality of ingress ports 20; a plurality of egress ports 30; a plurality of Qci modules 310, each comprising an ingress time gate 40 and an ingress timestamp functionality 320; a queue system 45 comprising a plurality of scheduled transmission time gates 50; a frame memory 60; and a plurality of rewriters 330, each comprising an egress timestamp functionality 340. An input of each ingress time gate 40 is coupled to a respective ingress port 20. An output of each ingress time gate 40 is coupled to a respective input of queue system 45. An output of each scheduled transmission time gate 50 is coupled to a respective egress port 30 via a respective rewriter 330.

In operation, as described above, a test data frame is transmitted from a talker via a respective ingress port 20 and a respective egress port 30 of TSN switch 300 to a listener. As further described above, in one embodiment a plurality of serially coupled TSN switches 300 are provided, the test data frame arranged to traverse each of the serially coupled TSN switches 300. Each timestamp functionality 320 is arranged to stamp a test data frame which arrives at the respective Qci module 310. The time stamped test data frame passes through the respective ingress time gate and enters queue system 45. In the event that the respective scheduled transmission time gate 50 associated with the target egress port 30 is open, the test data frame passes through and is time stamped by the respective timestamp functionality 340. In the event that the respective scheduled transmission time gate 50 is closed, the test data frame waits, optionally in frame memory 60, for the respective scheduled transmission time gate 50 to open. Once the respective scheduled transmission time gate 50 is open, the test data frame is passed through and timestamped by timestamp functionality 340, as described above. In one embodiment, a plurality of test frames are transmitted during the test mode, to test the path through each ingress time gate 40 and scheduled transmission time gate 50.

A TSN switch 300 has been illustrated and described, however this is not meant to be limiting and the above described method can be implemented in any type of scheduled network.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. A setup test method for scheduled networks, the method comprising:
    transmitting a frame to at least one network switch;
    responsive to said transmitted frame arriving at a first time gate of said at least one network switch, timestamping said transmitted frame with a first time stamp;
    alternately opening and closing the first time gate of said at least one network switch;
    in an operating mode, responsive to said transmitted frame arriving at said first time gate when said first time gate is closed, discarding said transmitted frame;
    in a testing mode, allowing said transmitted frame to pass through said first time gate whether said first time gate is open or closed;
    responsive to said transmitted frame traversing a second time gate of said at least one network switch, additionally timestamping said transmitted frame with a second time stamp;
    reading said first time stamp;
    responsive to said read first time stamp, determining the time of arrival of said transmitted frame at said first time gate;
    reading said second time stamp; and
    responsive to said read first time stamp, determining the time of traversal of said transmitted frame through said second time gate;
    wherein said transmitting a frame to at least one network switch comprises transmitting said frame through a plurality of network switches in serial communication with each other, each of the plurality of network switches comprising a respective first time gate and a respective second time gate, said transmitted frame being stamped with a respective first time stamp when arriving at the first time gate of each of the network switches and with a respective second time stamp when arriving at the second time gate of each of the network switches, and
    wherein the method further comprises, responsive to said transmitted frame exiting each of the respective network switches, reading said respective first and second time stamps.

2. The method of claim 1, further comprising:
    comparing said determined time of arrival with a predetermined desired time of arrival;

comparing said determined time of traversal with a predetermined desired time of traversal; and outputting the outcomes of said comparisons.

3. The method of claim 1, wherein said read respective first and second time stamps are overwritten by said respective first and second time stamps of a subsequent one of the plurality of network switches.

4. The method of claim 1, wherein the at least one network switch is coupled between a talker and a listener, the method further comprising:

initiating a transmission event at the talker, said transmission of said frame responsive to said initiated transmission event;

responsive to said initiated transmission event, timestamping said transmitted frame with a third time stamp;

responsive to arrival of said transmitted frame at the listener, timestamping said transmitted frame with a fourth time stamp;

reading said third time stamp;

responsive to said read third time stamp, determining the time of exit of said transmitted frame from the talker;

reading said fourth time stamp; and responsive to said read fourth time stamp, determining the time of arrival of said transmitted frame at the listener.

5. A scheduled network comprising:

a talker;

a listener;

at least one network switch coupled in series between said talker and said listener, each of said at least one network switch comprising a first time gate, a second time gate and a timestamp functionality, said talker arranged to transmit a frame to said at least one network switch and said listener arranged to receive said transmitted frame after traversing said at least one network switch; and a control circuitry, wherein responsive to said transmitted frame arriving at said first time gate of said at least one network switch, said timestamp functionality of said at least one network switch is arranged to timestamp said transmitted frame with a first time stamp, wherein said first time gate of said at least one network switch is arranged to alternately open and close, wherein each of said at least one network switch further comprises a gate module, said gate module arranged in an operating mode, responsive to said transmitted frame arriving at said first time gate when said first time gate is closed, to discard said transmitted frame, wherein said gate module is arranged in a testing mode, to allow said transmitted frame to pass through said first time gate whether said first time gate is open or closed, wherein responsive to said transmitted frame traversing said second time gate of said at least one network switch, said timestamp functionality is arranged to additionally timestamp said transmitted frame with a second time stamp, and wherein said control circuitry is arranged to:

read said first time stamp;

responsive to said read first time stamp, determine the time of arrival of said transmitted frame at said first time gate;

read said second time stamp; and responsive to said read second time stamp, determine the time of traversal of said transmitted frame through said second time gate;

wherein said at least one network switch comprises a plurality of network switches in serial communication with each other, each of said plurality of network switches comprising a respective first time gate, a respective second time gate and a respective timestamp functionality, wherein said respective timestamp functionality of each of said plurality of network switches is arranged to stamp said transmitted frame with a respective first time stamp when said transmitted frame arrives at said first time gate of said respective network switch and with a respective second time stamp when said transmitted frame arrives at said second time gate of said respective network switch, and wherein responsive to said transmitted frame exiting each of said respective switches, said control circuitry is arranged to read said respective first and second time stamps.

6. The network of claim 5, wherein said control circuitry is further arranged to:

compare said determined time of arrival with a predetermined desired time of arrival;

compare said determined time of traversal with a predetermined desired time of traversal; and output the outcomes of said comparisons.

7. The network of claim 5, wherein said read respective first and second time stamps are overwritten by said respective first and second time stamps of a subsequent one of the plurality of network switches.

8. The network of claim 5, wherein each of said talker and said listener comprises a respective timestamp functionality, wherein said control circuitry is further arranged to initiate a transmission event at said talker, said transmission of said frame responsive to said initiated transmission event, said timestamp functionality of said talker arranged to timestamp said transmitted frame with a third time stamp responsive to said initiated transmission event, wherein said timestamp functionality of said listener is arranged to timestamp said transmitted frame with a fourth time stamp responsive to arrival of said transmitted frame at said listener, wherein said control circuitry is further arranged to:

read said third time stamp;

responsive to said read third time stamp, determine the time of exit of said transmitted frame from said talker;

read said fourth time stamp; and responsive to said read fourth time stamp, determine the time of arrival of said transmitted frame at the listener.

* * * * *